US012748035B2

(12) United States Patent
Jiang et al.

(10) Patent No.: US 12,748,035 B2
(45) Date of Patent: Sep. 29, 2026

(54) OPTICAL SYSTEM FOR SAMPLE PROCESSING INSTRUMENT AND SAMPLE PROCESSING INSTRUMENT

(71) Applicant: Beckman Coulter Biotechnology (Suzhou) Co., Ltd., Suzhou (CN)

(72) Inventors: Ke Jiang, Suzhou (CN); Jianhua Wang, Suzhou (CN)

(73) Assignee: Beckman Coulter Biotechnology (Suzhou) Co., Ltd., Suzhou (CN)

( * ) Notice: Subject to any disclaimer, the term of this patent is extended or adjusted under 35 U.S.C. 154(b) by 99 days.

(21) Appl. No.: 18/834,341

(22) PCT Filed: Jan. 13, 2023

(86) PCT No.: PCT/CN2023/072062
§ 371 (c)(1),
(2) Date: Jul. 30, 2024

(87) PCT Pub. No.: WO2023/143122
PCT Pub. Date: Aug. 3, 2023

(65) Prior Publication Data
US 2025/0130158 A1 Apr. 24, 2025

(30) Foreign Application Priority Data
Jan. 30, 2022 (CN) ......................... 202210115333.3

(51) Int. Cl.
*G01N 15/1434* (2024.01)
*G01N 15/10* (2024.01)
(Continued)

(52) U.S. Cl.
CPC ........... *G01N 15/1436* (2013.01); *G02B 7/04* (2013.01); *G02B 19/0009* (2013.01);
(Continued)

(58) Field of Classification Search
CPC ........... G01N 15/1436; G01N 15/1434; G01N 15/1459; G01N 2015/1006; G01N 1/28;
(Continued)

(56) References Cited

U.S. PATENT DOCUMENTS 5,132,548 A 7/1992 Borden et al.
5,596,456 A 1/1997 Luecke
(Continued)

FOREIGN PATENT DOCUMENTS

CN 207067543 U 3/2018
CN 209388050 U 9/2019
(Continued)

OTHER PUBLICATIONS

Elgrona et al "Method for Controlling Position at Which Laser Beam Used in Flow Cytometry Impinges on Flow Cell, Involves Controlling Temperature of Prisms, so as to Control Position of Laser Beam Impinging on Cell", Nov. 3, 2021, EP 3904 942 A1 (Year: 2021).*
(Continued)

*Primary Examiner* — Sang H Nguyen
(74) *Attorney, Agent, or Firm* — Merchant & Gould P.C.

(57) ABSTRACT

The present disclosure relates to an optical system for a sample processing instrument including a flow cell with a detection channel for passage and detection of a sample. The optical system includes: a laser source; a collimating device configured to collimate beam emitted from the laser source; a focusing lens configured to focus the light beam from the laser source within the detection channel; and a reshaping device disposed between the collimating device and the focusing lens and configured to reshape spot of the collimated light beam. The reshaping device includes a first prism pair including two prisms being adjustable relative to each other so that the beam of the laser source has a
(Continued)

predetermined size in a first direction. A sample processing instrument including the above optical system and flow cell is further provided therein.

16 Claims, 7 Drawing Sheets

(51) Int. Cl.

| | |
|---|---|
| ***G02B 7/04*** | (2021.01) |
| ***G02B 19/00*** | (2006.01) |
| ***G02B 27/09*** | (2006.01) |
| ***G02B 27/10*** | (2006.01) |
| ***G02B 27/14*** | (2006.01) |
| ***G02B 27/30*** | (2006.01) |

(52) U.S. Cl.
CPC ..... *G02B 19/0047* (2013.01); *G02B 27/0972* (2013.01); *G01N 2015/1006* (2013.01); *G02B 27/1006* (2013.01); *G02B 27/14* (2013.01); *G02B 27/30* (2013.01)

(58) Field of Classification Search
CPC .. G02B 7/04; G02B 19/0009; G02B 19/0047; G02B 27/0972; G02B 27/1006; G02B 27/14; G02B 27/30; G02B 27/0916; G02B 27/0955
See application file for complete search history.

(56) References Cited

U.S. PATENT DOCUMENTS

| | | | | |
|---|---|---|---|---|
| 5,715,102 | A * | 2/1998 | Chao | G11B 7/1398 359/833 |
| 5,796,112 | A | 8/1998 | Ichie | |
| 2006/0233206 | A1* | 10/2006 | Miner | G02F 1/37 372/22 |
| 2014/0118843 | A1* | 5/2014 | Muenz | G02B 27/0927 359/709 |
| 2019/0004299 | A1 | 1/2019 | Kukura et al. | |
| 2022/0163786 | A1* | 5/2022 | Hargis | B81B 3/0067 |

FOREIGN PATENT DOCUMENTS

| | | | |
|---|---|---|---|
| CN | 113238388 | A | 8/2021 |
| WO | 01/40764 | A2 | 6/2001 |

OTHER PUBLICATIONS

Yang et al "A Beam Shaping System and Method of Flow Cytometry", Aug. 10, 2021, CN 113238388A (Year: 2021).*
Liang et al "Fluorescence Detection System and Cell Analyzer", May 8, 2013, CN 103091211A (Year: 2013).*
International Search Report and Written Opinion for PCT/CN2023/072062 (May 9, 2023).

* cited by examiner

100

OPTICAL SYSTEM FOR SAMPLE PROCESSING INSTRUMENT AND SAMPLE PROCESSING INSTRUMENT

This application is a U.S. National Stage Application of PCT International Application No. PCT/CN2023/072062, filed on Jan. 13, 2023, which claims the benefit of and priority to Chinese Patent Application No. 202210115333.3, filed Jan. 30, 2022, the entire disclosures of which are hereby incorporated by reference in their entireties. To the extent appropriate, a claim of priority is made to each of the above-disclosed applications.

FIELD

The present disclosure relates to an optical system for a sample processing instrument such as a flow cytometer/analyzer, and in particular to an optical system including multiple light sources and a sample processing instrument including the optical system.

BACKGROUND

This section only provides background information related to the present disclosure, which is not necessarily the prior art.

A sample processing instrument is generally used to analyze liquid samples including small suspended particles (e.g., biological particles, non-biological particles) or cells and/or to sort the particles or cells therein. A laser diode is often used as the light source for the optical system of the sample processing instrument. The beam emitted from the laser diode is focused inside the detection channel of the flow cell of the sample processing instrument. When a particle or cell in the sample is passing through the detection channel, it is illuminated by the light beam, thereby emitting fluorescent or scattered light for detection.

Due to a large divergence of the laser diode (also referred to herein as a laser light source), the beam emitted from the laser diode is required to be collimated. The size of the collimated laser beam decides the size of the beam focused within the flow cell. Therefore, the consistency of the laser beams is very important for the detection of samples. For example, for the same batch of sample processing instruments, the consistency of sample analysis results is very important. For example, it may be desired to have consistency of laser beams with the same wavelength in different sample processing instruments. Moreover, for a single sample processing instrument having multiple laser light sources, it may sometimes be desired to have consistency (e.g., in size or focusing position) of beams emitted from all the laser sources.

However, a laser diode is manufactured with a certain divergence tolerance, and different laser diodes have different divergence tolerances. To meet the requirements of detection, a laser diode is selected with a specific divergence tolerance. In addition, when consistency of the laser beams is not good, the laser module may need to be updated or replaced. Thus, the labor time of the laser diode is wasted, and the cost is too high.

SUMMARY

A general summary of the present disclosure is provided in this section, rather than the full scope of the present disclosure or a comprehensive disclosure of all features of the present disclosure.

In view of the above problems of the existing optical system of the sample processing instrument, an object of the present application is to provide an optical system and a sample processing instrument including a reshaping device. The light emitted from the laser light source can be shaped by the reshaping device so that the reshaped beam has a desired size in a predetermined direction. It is also possible to reshape the light emitted from at least one laser light source by the reshaping device so that multiple laser beams have the same size in a predetermined direction, thereby improving the detection performance.

The optical system according to the present disclosure is adapted to sample processing instruments. For example, the optical system according to the present disclosure can enable the beams of various laser sources in a single sample processing instrument using the optical system to have a uniform size after reshaping. For example, the optical system according to the present disclosure can enable the size of the beam reshaped by the optical system to be the same as the size of the beam of a certain laser source of another different sample processing instrument.

According to an aspect of the present disclosure, there is provided an optical system for a sample processing instrument including a flow cell having a detection channel for passage and detection of a sample. The optical system includes: a laser source; a collimating device configured to collimate light beam emitted from the laser source; a focusing lens configured to focus the light beam coming from the laser source on a point within the detection channel; and a reshaping device disposed between the collimating device and the focusing lens and configured to reshape a light spot of the collimated light beam. The reshaping devices includes a first prism pair including two prisms, and the two prisms are adjustable relative to each other, so that the light beam of the laser source has a predetermined size in a first direction.

According to the optical system of the present disclosure, the beams of all laser light sources of a same sample processing instrument can have the same size through the reshaping devices, or the beam reshaped by the optical system can have the same size as the beam of a laser source of any other sample processing instrument. It is thus possible to avoid replacing laser light sources or laser modules whose divergence angles do not meet the requirements. In this way, more laser light sources can be adapted to the sample processing instrument, thereby significantly reducing costs and saving time.

In some embodiments according to the present disclosure, the reshaping device further includes a second prism pair including two prisms. The two prisms are adjustable relative to each other, so that the light beam of the laser source has a predetermined size in a second direction perpendicular to the first direction.

In some embodiments according to the present disclosure, the two prisms of the prism pare or each prism pair can be rotated and/or translated relative to each other.

In some embodiments according to the present disclosure, the two prisms of the prism pare or each prism pair are made of the same material.

In some embodiments according to the present disclosure, the material has a refractive index ranging from 1.4 to 1.8.

In some embodiments according to the present disclosure, each of the two prisms of the prism pare or each prism pair has an incident surface where the light beam enters the prism and an exit surface where the light beam exits the prism, and the two prisms of the prism pare or each prism pair are arranged to have the same incident angle at the incident surfaces and the same exit angle at the exit surfaces with respect to the same light beam.

In some embodiments according to the present disclosure, the two prisms of the prism pare or each prism pair have the same structure.

In some embodiments according to the present disclosure, an angle between the incident surface and the exit surface of each prism is in the range of 20° to 45°.

In some embodiments according to the present disclosure, an anti-reflection film is coated on the incident surface and/or the exit surface.

In some embodiments according to the present disclosure, the anti-reflection film on one of the incident surface and the exit surface is designed or selected for an incident angle or an exit angle of 0° to 10°, and the anti-reflection film on the other of the incident surface and the exit surface is designed or selected for an incident angle or an exit angle of 40° to 60°.

In some embodiments according to the present disclosure, the prism pare or each prism pair is configured such that the size ratio of the light beam after exiting the prism pair to the light beam before entering the prism pair is between 0.5 and 2.75.

In some embodiments according to the present disclosure, a focus adjustment device is provided between the laser source and the focusing lens, and the focus adjustment device is configured to adjust focus of the light beam emitted from the laser source to a predetermined position within the detection channel.

In some embodiments according to the present disclosure, the focus adjustment device is composed of two optical parts, and the distance between the two optical parts is adjustable. Each of the two optical parts is selected from one of a convex lens, a concave lens, a cylindrical lens, a doublet lens, or a lens group.

In some embodiments according to the present disclosure, the optical system includes a plurality of laser sources emitting the light beams having mutually different wavelengths, and a beam-combination mirror is provided between each laser source and the focusing lens.

In some embodiments according to the present disclosure, the reshaping devices and the focus adjustment devices are disposed between each laser light sources and the respective beam combiners.

A sample processing instrument is provided according to another aspect of the present disclosure. The sample processing instrument includes the above optical system and a flow cell. The flow cell has the detection channel through which a liquid sample flows, and the optical system is configured to detect particles in the liquid sample.

The above and other objects, features and advantages of the present disclosure will be more fully understood from the detailed description given below and the accompanying drawings, which are given by way of illustration only and therefore are not considered to limit the present disclosure.

BRIEF DESCRIPTION OF THE DRAWINGS

The features and advantages of one or more embodiments of the present disclosure will become more readily understood from the following description with reference to the accompanying drawings in which.

DETAILED DESCRIPTION OF THE EMBODIMENTS

Figure 1A:
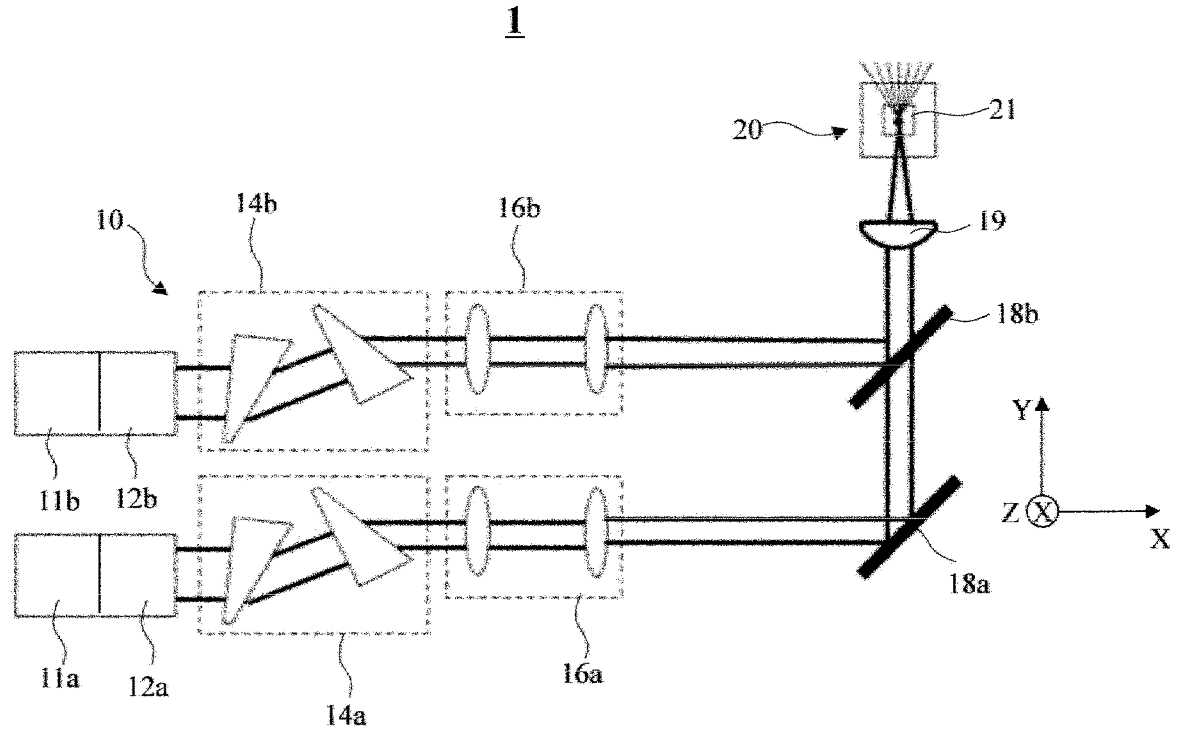
FIG. 1A and FIG. 1B are schematic top and side views of a sample processing instrument with an optical system according to a first embodiment of the present disclosure, respectively.

The following detailed description of the present disclosure is for explanation only and is by no means intended to limit the present disclosure and the applications or usages thereof. The implementations described in this specification are not exhaustive and are merely some of many possible implementations. Exemplary embodiments may be embodied in many different forms and should not be construed as limiting the scope of the present disclosure. In some example embodiments, well-known processes, well-known device structures, and well-known technologies may not be described in detail.

The optical system and sample processing instrument according to the present disclosure are suitable for detection or sorting of liquid samples containing biological particles (e.g., extracellular vesicles) or non-biological particles (e.g., beads). The optical system and the sample processing instrument according to the present disclosure will be described below with reference to the accompanying drawings. In several drawings, similar reference numerals refer to similar parts and components.

Figure 1B:
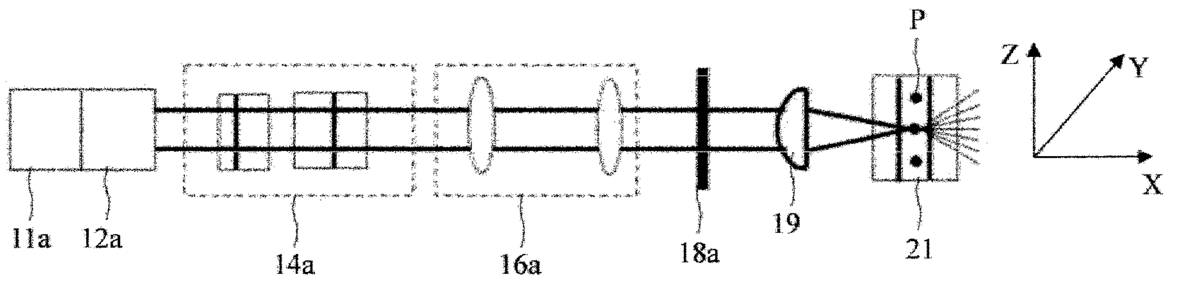

FIG. 1A and FIG. 1B are schematic top and side views of a sample processing instrument 1 with an optical system 10 according to a first embodiment of the present disclosure, respectively. As shown in FIG. 1A and FIG. 1B, the sample processing instrument 1 includes a flow cell 20 in addition to the optical system 10. The flow cell 20 has a detection channel 21 through which the liquid sample passes and is detected. The flow cell 20 may be made of a light-transmitting material in order to irradiate the light beam onto the particles P passing through the detection channel 21 and collect the light beam from the particles P.

In the sample processing instrument 1, the sheath fluid and the sample are delivered to the flow cell 20 through fluid piping (not shown). In the flow cell 20, the sheath fluid wraps the sample, so that the particles P contained in the sample can flow through the detection channel 21 of the flow cell 20 in a single row linearly. The light beams emitted by the light sources in the optical system 10 are focused on a point within the detection channel 21. When the sample is flowing through the detection channel 21, the particles P contained in the sample pass through the focal point of the light beams and are irradiated by the light beams at the focal point. Under the illumination of the light beams, the particles P may emit fluorescent light or scattered light. By collecting the fluorescence or scattered light emitted from the particles P, and by processing and analyzing the signals of the fluorescence or scattered light, the information of the detected particles P can be obtained.

Herein, for the convenience of description, the extension axis of the detection channel 21 of the flow cell 20 (i.e., the flow direction of the sample) is defined as the Z axis; the central axis (or optical axis) of the light beam focused in the detection channel 21 is defined as the Y axis; and the axis perpendicular to the Z axis and Y axis is defined as the X axis.

The optical system 10 shown in FIG. 1A and FIG. 1B enables the light beam projected on the particle P to have a predetermined size in the X-axis direction. As shown in FIG. 1A and FIG. 1B, the optical system 10 includes laser light sources 11*a* and 11*b*. The laser light sources 11*a* and 11*b* are, for example, laser diodes. The laser light sources 11*a* and 11*b* may be provided in a same sample processing instrument or in different sample processing instruments. The laser light sources 11*a* and 11*b* may emit beams having the same wavelengths, for example, in different sample processing instruments. Alternatively, The light beams emitted by the laser light sources 11*a* and 11*b* may have different wavelengths, for example, 405 nm, 488 nm, 561 nm or 638 nm, for example, in the same sample processing instrument as shown in FIGS. 1A and 1B.

In the example shown, two laser light sources 11*a* to 11*d* are arranged in parallel. It should be understood that the number, type, and arrangement of laser light sources are not limited to the specific example shown, but may be changed as required. For example, the optical system may include three, four, or any other suitable number of laser light sources.

The optical system 10 further includes a focusing lens 19. The light beams emitted from light sources 11*a* and 11*b* are focused via focusing lens 19 on the same detection position in detection channel 21 of flow cell 20, and the detection position may be referred to as the focus point or interrogation point.

The optical system 10 further includes collimating devices 12*a* and 12*b*. The collimating devices 12*a* and 12*b* are used for collimating the light beams emitted by the laser light sources 11*a* and 11*b*, respectively. The light beams emitted from the laser light sources 11*a* and 11*b* are generally divergent with a certain angle. The light beams emitted from the laser light sources 11*a* and 11*b* can be changed into parallel light beams with a desired size by the collimating devices 12*a* and 12*b*.

The optical system 10 further includes reshaping devices 14*a* and 14*b*. The reshaping devices 14*a* and 14*b* are arranged between the respective collimating devices 12*a* and 12*b* and the focusing lens 19. The reshaping devices 14*a* and 14*b* are used to reshape the collimated light beams so that the light spot focused on the particle P has a uniform size in the X-axis direction.

Laser light sources (laser diodes) are manufactured with a certain divergence tolerance, and different laser diodes have different divergence tolerances. Even after the beams are collimated by the collimating devices 12*a* and 12*b*, the collimated beams still have size differences. The reshaping devices 14*a* and 14*b* can eliminate or reduce the size difference between the collimated beams. In the embodiment shown in FIG. 1A and FIG. 1B, the reshaping devices 14*a* and 14*b* are configured to adjust the size of the light beams projected on the particle P in the X-axis direction. The specific structures of the reshaping devices 14*a* and 14*b* will be described in detail later with reference to FIG. 4.

The optical system 10 further includes focus adjustment devices 16*a* and 16*b*. The focus adjustment devices 16*a* and 16*b* are provided between the respective laser light sources 11*a* and 11*b* and the focusing lens 19. The focus adjustment devices 16*a* and 16*b* are used to adjust the focus of the light beams emitted from the laser light sources 11*a* and 11*b* to a predetermined position (for example, the center position in the Y-axis direction) within the detection channel 21, that is, adjust the waist position of the focused beam in the Y-axis direction. The specific structures of the focus adjustment devices 16*a* and 16*b* will be described in detail later with reference to FIG. 7A to FIG. 7C.

The optical system 10 further includes beam combiners 18*a* and 18*b*. The beam combiners 18*a* and 18*b* are provided between the respective laser light sources 11*a* and 11*b* and the focusing lens 19. Each of the beam combiners 18*a* and 18*b* is used to reflect the light beam of the corresponding laser light source 11*a* or 11*b*, while allowing the light beam of the other laser light source to pass through. The beam combiners 18*a* and 18*b* can be selected and arranged according to the wavelengths of the light beams emitted by the corresponding laser light sources 11*a* and 11*b*. For example, beam combiner 18*a* may be configured to reflect light of wavelengths emitted by laser light source 11*b*; and the beam combiner 18*b* may be configured to reflect the light of the wavelength emitted by the laser light source 11*b* and to transmit the light of the wavelength emitted by the laser light source 11*a*.

Figure 7A:
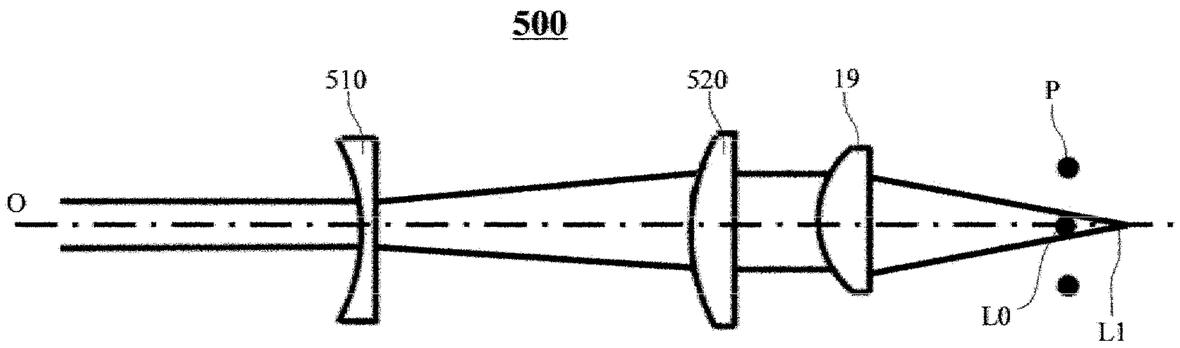
FIG. 7A to FIG. 7C are schematic diagrams illustrating the adjustment of the waist position of the light beam by the focus adjustment device.
Figure 7B:
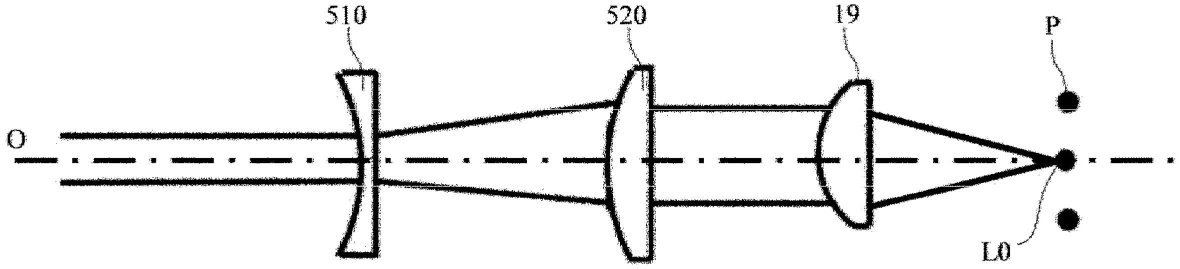
Figure 7C:
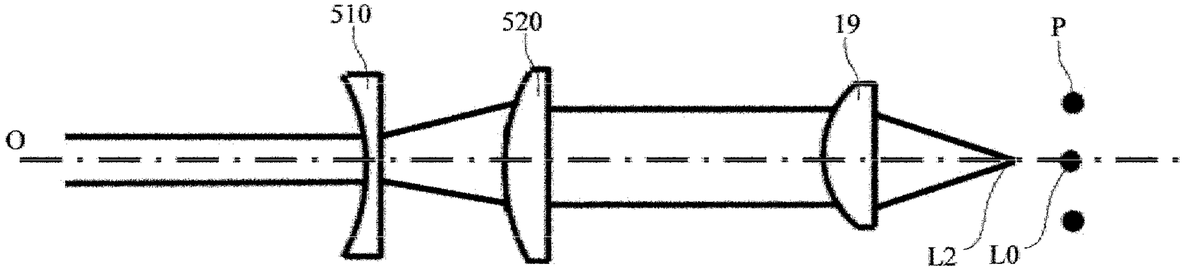

The light beams emitted by the light sources 11*a* and 11*b* are formed into collinear light beams after being reflected or transmitted by the beam combiners 18*a* and 18*b*. A collinear light beam refers to having the same optical axis (optical axis O as shown in FIG. 7A to FIG. 7C). The collinear beams facilitate co-focus of multiple light sources, i.e. focusing on the same detection position. The position or orientation of the beam combiners 18*a* and 18*b* is adjustable, whereby the position of the focal point of the light beam can be adjusted, particularly in a plane perpendicular to the optical axis.

The various components of the optical system according to the present disclosure and the functions of the various components are summarized above with reference to FIG. 1A and FIG. 1B, However, it should be understood that each component of the optical system according to the present disclosure, as well as the number, type and arrangement of each component, etc., should not be limited to the specific examples shown, but can be changed as needed as long as it can realize the functions described herein.

Figure 2A:
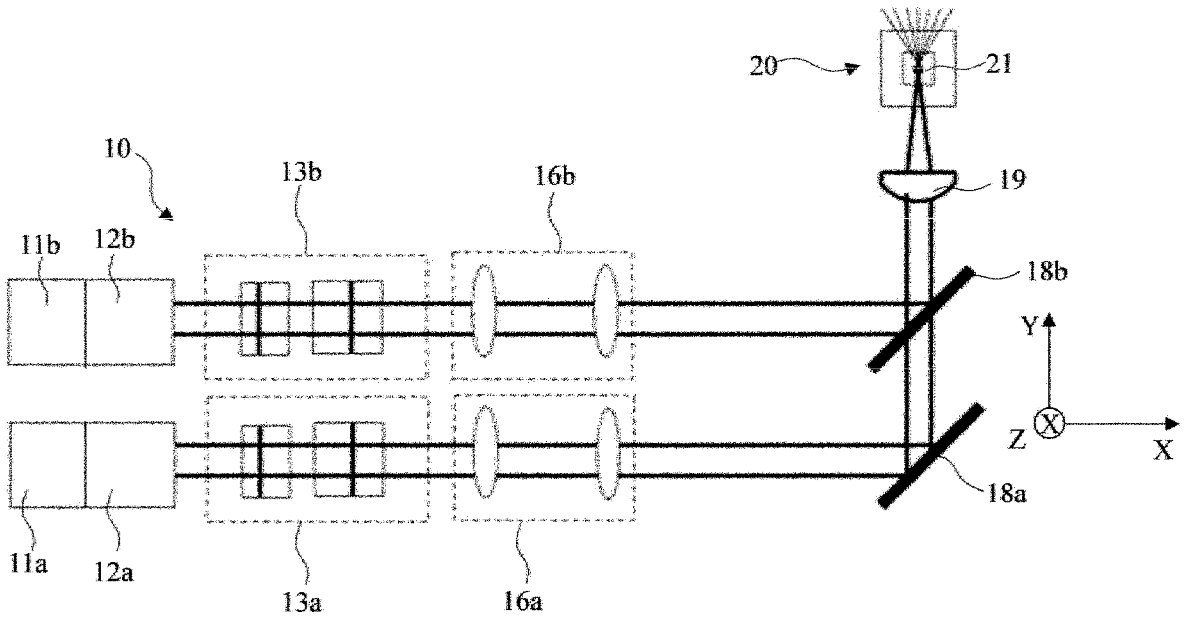
FIG. 2A and FIG. 2B are schematic top and side views of a sample processing instrument with an optical system according to a second embodiment of the present disclosure, respectively.
Figure 2B:
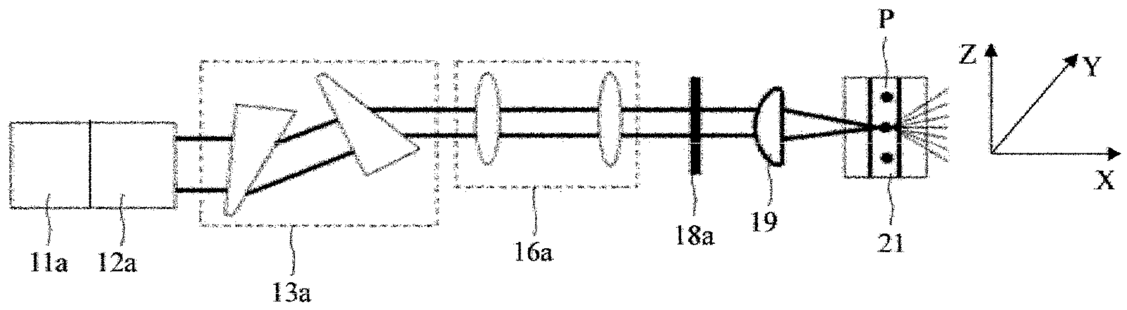

For example, in the embodiment shown in FIG. 2A and FIG. 2B, the optical system includes reshaping devices 13*a* and 13*b* for making the spot focused on particle P have a uniform size in the Z-axis direction, instead of the reshaping devices 14*a* and 14*b* shown in FIG. 1A and FIG. 1B for making the spot focused on particle P have a uniform size in the X-axis direction.

Figure 3A:
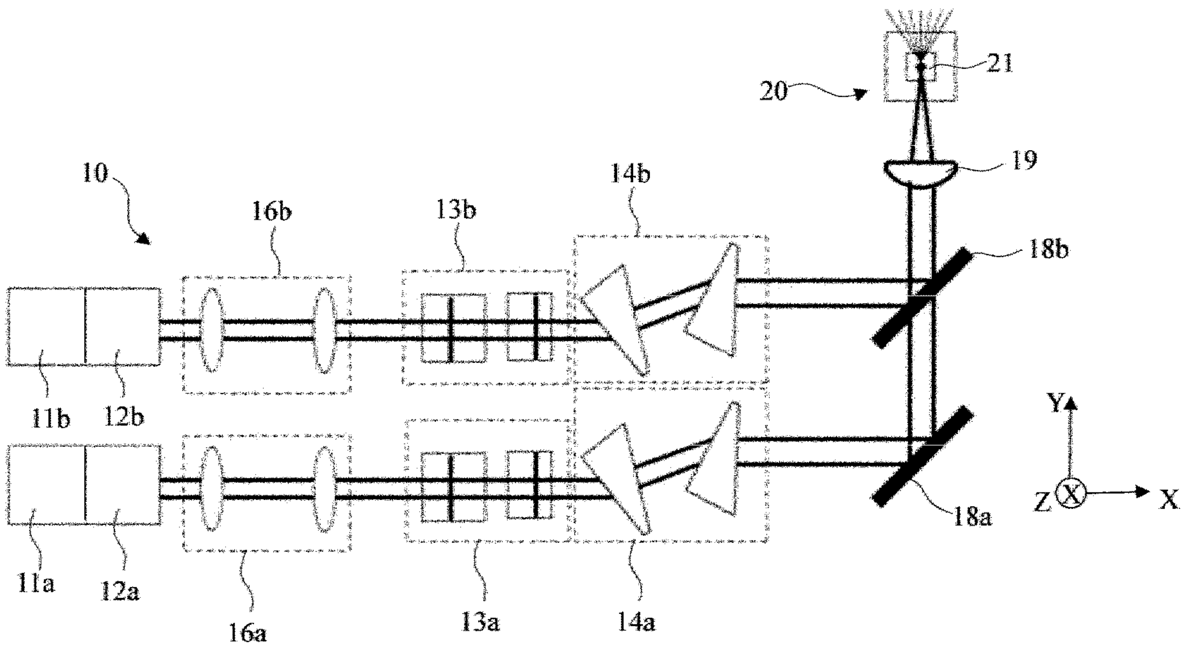
FIG. 3A and FIG. 3B are schematic top and side views of a sample processing instrument with an optical system according to a third embodiment of the present disclosure, respectively.
Figure 3B:
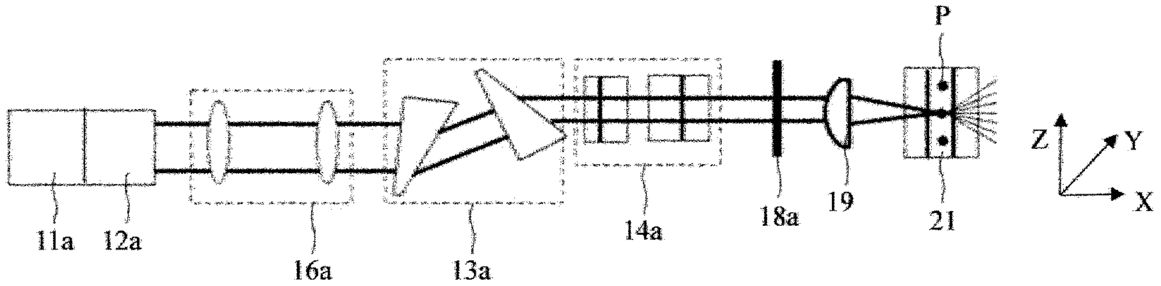

For example, in the embodiment shown in FIG. 3A and FIG. 3B, the optical system includes both reshaping devices 13*a* and 13*b* for making the spot focused on particle P have a uniform size in the Z-axis direction, and the reshaping devices 14*a* and 14*b* for making the spot focused on particle P have a uniform size in the X-axis direction.

For example, in the embodiment shown in FIG. 1A to FIG. 2B, the focus adjustment device 16*a* or 16*b* may be located between the reshaping device and the beam combiner. In the embodiment shown in FIG. 3A and FIG. 3B, the focus adjustment device 16*a* or 16*b* may be located between the laser light source and the reshaping device.

For example, the laser light sources 11*a* and 11*b* may have different arrangements of the same optical components or may have different optical components. For example, the focus adjustment device 16*a* may be disposed between the laser light source 11*a* and the reshaping device 13*a*, and the focus adjustment device 16*b* may be disposed between the reshaping device 13*b* and the beam combiner 18*b*. For example, reshaping devices or focus adjustment devices may be provided only for the laser light source 11*a* or 11*b*. For example, the beam combiner 18*a* may be a mirror having only a reflective function, different from the beam combiner 18*b*.

The reshaping device 100 according to the present disclosure will be described below with reference to FIG. 4. The reshaping device 100 according to the present disclosure (for example, reshaping devices 14*a* and 14*b* shown in FIG. 1A and FIG. 1B, reshaping devices 13*a* and 13*b* shown in FIG. 2A and FIG. 2B) is composed of a prism pair. By changing the arrangement of the prism pair, the desired size of light beam can be obtained in the desired direction.

Figure 4:
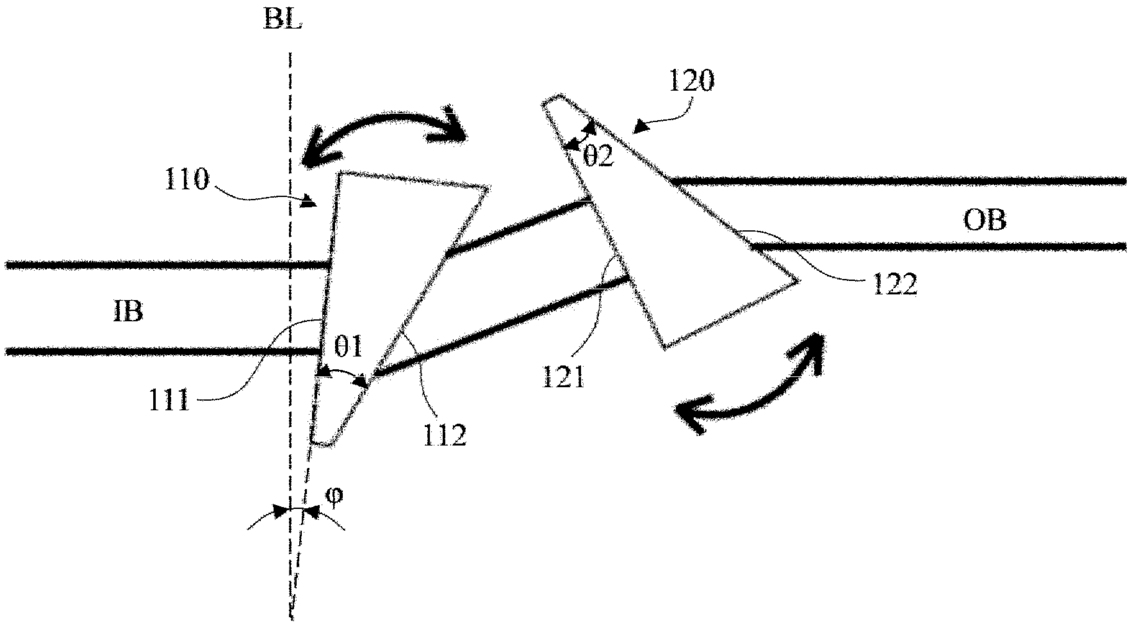
FIG. 4 is a schematic view of a reshaping device according to an embodiment of the present disclosure.
Figure 5A:
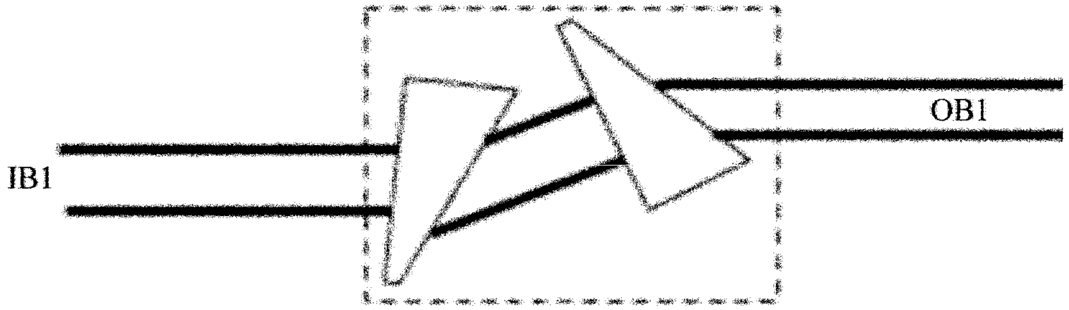
FIG. 5A and FIG. 5B are schematic views showing that incident beams of different sizes are adjusted to outgoing beams of the same size by reshaping devices.
Figure 5B:
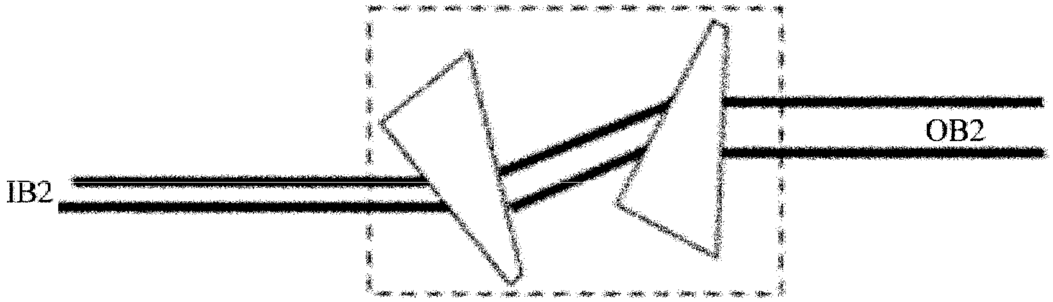

Referring to FIG. 4, the parallel incident light beam IB enters the reshaping device 100 at a certain incident angle, and becomes a parallel outgoing light beam OB after exiting the reshaping device 100 at a certain exit angle. The incident angle refers to the angle of the incident light relative to the normal direction of the incident surface, and the exit angle refers to the angle of the outgoing light relative to the normal direction of the exit surface. In FIG. 4, the outgoing light beam OB and the incident light beam IB have different sizes in the vertical direction (e.g., the above-mentioned X-axis direction or Z-axis direction). In the example shown in FIG. 4, the size of the outgoing light beam OB is smaller than the size of the incident light beam IB in the vertical direction. It should be understood that the reshaping device 100 can be set so that the size of the outgoing light beam OB in a predetermined direction (for example, the above-mentioned X-axis direction or Z-axis direction) is equal to or larger than the size of the incident light beam IB (for example, as shown in FIG. 5B). For example, the reshaping device 100 is configured such that the size ratio of the outgoing light beam OB after exiting the reshaping device to the incident light beam IB before entering the reshaping device in the predetermined direction is between about 0.5 and 2.75.

The reshaping device 100 includes a first prism 110 and a second prism 120. The first prism 110 has an incident surface 111 where the incident light beam IB enters the first prism 110 and an exit surface 112 where the incident light beam IB exits the first prism 110. An acute angle θ1 is formed between the incident surface 111 and the exit surface 112. Similarly, the second prism 120 has an incident surface 121 where the light beam enters the second prism 120 and an exit surface 122 where the light beam exits the second prism 120. An acute angle θ2 is formed between the incident surface 121 and the exit surface 122. The acute angle θ1 or θ2 of the first prism 110 or the second prism 120 can change the size ratio of the outgoing light beam OB to the incident light beam IB. In other words, the acute angles θ1 and θ2 of the first prism 110 and the second prism 120 may be designed or selected according to the desired size ratio. For example, the acute angles θ1 and θ2 may be in the range of about 20° to 45°. Optionally, the acute angles θ1 and θ2 may be about 30°.

Furthermore, if the materials of the first prism 110 or the second prism 120 are different, they may have different refractive indexes. Therefore, the material of the first prism 110 or the second prism 120 can also change the size ratio of the outgoing light beam OB to the incident light beam IB. In other words, materials of the first prism 110 and the second prism 120 may be selected according to a desired size ratio. For example, the first prism 110 or the second prism 120 may be made of a material having a refractive index of about 1.4 to 1.8, such as fused silica, N-BK7 or equivalent material, LF5 or equivalent material, SF11 or equivalent material.

The first prism 110 and the second prism 120 may be made of the same material and may have the same structure (especially, the acute angles θ1 and θ2 have the same value). The first prism 110 and the second prism 120 may be oppositely arranged. The incident angles at the incident surfaces 111 and 121 may be the same, and the exit angles at the exit surfaces 112 and 122 may also be the same, thereby ensuring that the propagation direction of the outgoing light beam OB is parallel to the propagation direction of the incident light beam IB.

For ease of description, a base line BL that is perpendicular to the incident light beam IB is introduced. The base line BL is shown in dotted line. The incident surface 111 is deflected by an angle φ with respect to the base line BL. The angle φ is an acute angle and corresponds to the incidence angle of the incident light beam IB relative to the normal direction of incident surface 111. For convenience of description, the angle φ at which the incident surface 111 deflects clockwise with respect to the base line BL is defined as positive (as shown in FIG. 4 and FIG. 5A), whereas the angle φ at which the incident surface 111 deflects counterclockwise with respect to the base line BL is defined as negative (as shown in FIG. 5B). The magnitude of the angle φ and the direction of deflection can change the size ratio of the outgoing light beam OB to the incident light beam IB. In other words, the magnitude of the angle φ and the deflection direction can be designed or selected according to the desired size ratio.

The deflection angle φ may be determined based on the deflective index of the prism, the angle formed between the incident surface and exit surface, the size ratio of outgoing beam to incident beam, etc. By determining the deflection angle φ, the prism may be appropriately placed relative to the base line BL (i.e., incident beam) in position.

Figure 6A:
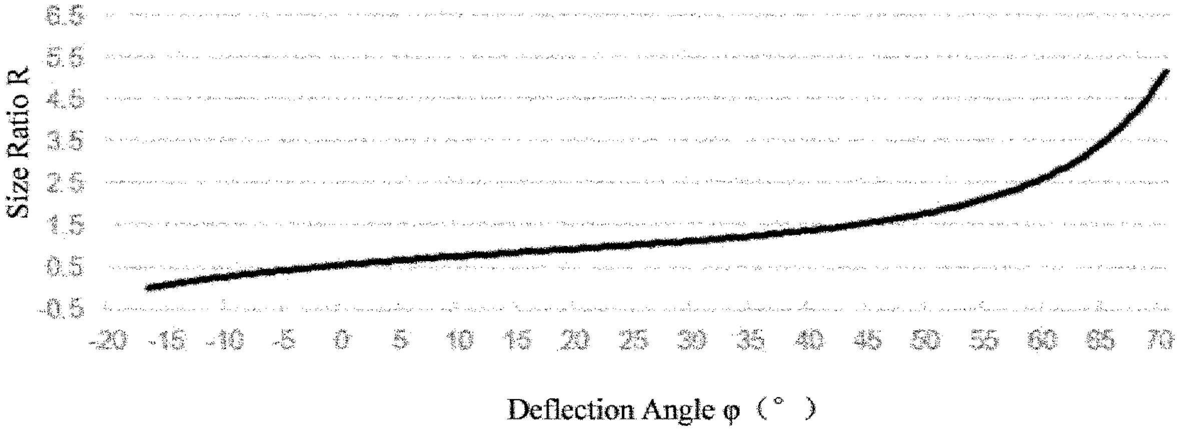
FIG. 6A is a schematic graph of a prism of a particular material and structure showing the size ratio of the outgoing light beam to the incident light beam versus the deflection angle of the prism.
Figure 6B:
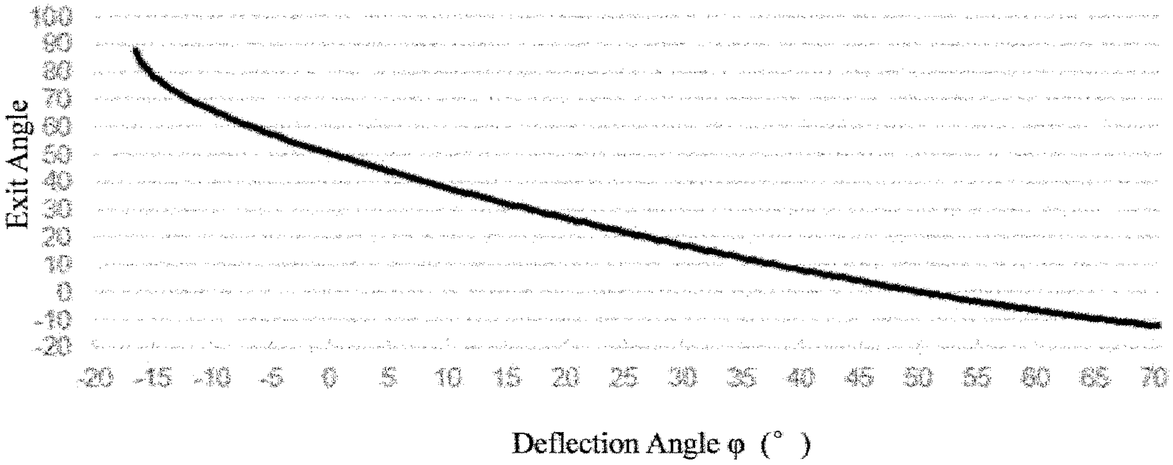
FIG. 6B is a schematic graph of deflection angle of a prism versus exit angle of light beam.

How to set the prism pair will be described below with reference to FIG. 6A and FIG. 6B. The graphs of FIGS. 6A and 6B are drawn with respect to a first prism 110 made of N-BK7 and having the angle θ1 of 30°. FIG. 6A is a schematic graph of the size ratio of the outgoing light beam to the incident light beam versus the deflection angle of the first prism 110, and FIG. 6B is a schematic graph of deflection angle of the first prism 110 versus exit angle of beam.

According to the graph of FIG. 6A and based on a desired size ratio R (vertical axis), the deflection angle φ (horizontal axis) of the first prism 110 can be firstly determined. According to the determined deflection angle φ, the first prism 110 may be place in position with respect to the incident light beam.

Then, according to the graph of FIG. 6B and based on the deflection angle φ of the first prism 110, the exit angle of the light beam at the exit surface 112 may be determined. Provided that the first prism 110 and the second prism 120 have the same material and structure, particularly, the same incident angles at the incident surfaces 111 and 121 and the same exit angles at the exit surfaces 112 and 122, as described above, the incident and exit angles of the second prism 120 have already been determined. Based on the incident and exit angles of the first and second prisms 110 and 120, the second prism 120 may be placed in position.

The first prism 110 or the second prism 120 is adjustable relative to each other, so that the beams of the corresponding laser light sources have the same size in the first direction as beams of the other laser light sources. Referring to FIG. 5A and FIG. 5B. FIG. 5A shows a schematic diagram of reshaping beam of a laser light source 11*a* or 11*b*, whereas FIG. 5B is a schematic diagram of reshaping beam of the other laser light source 11*a* or 11*b*. As shown in FIG. 5A and FIG. 5B, the incident light beams IB1 and IB2 of the two laser light sources have different sizes, but the reshaped outgoing light beams OB1 and OB2 have the same size. This can be achieved by adjusting the relative position of the individual prism pairs. The relative position of the two prisms in FIG. 5A are adjusted to reduce the size of the beam, and the relative position of the two prisms in FIG. 5B are adjusted to expand the size of the beam.

The first prism and the second prism of each reshaping device (each prism pair) can be rotated relative to each other (as indicated by the arrows in FIG. 4). In case that the first prism and the second prism rotate, the incident angle and the outgoing angle may change, and the size ratio of the outgoing light beam OB and the incident light beam IB may be changed accordingly.

The first prism and the second prism of each reshaping device may be translated relative to each other. In case that the first prism and the second prism are translated (for example, along the horizontal or vertical direction), the position of the outgoing light beam OB may change (for example, along the direction perpendicular to the light beam), but the size of the outgoing light beam OB may not change substantially.

Since the first prism and the second prism can be adjusted easily or in real time, the reshaping device according to the present disclosure can be applied to various laser light sources and can make the spot projected on the particle have a uniform size in at least one direction.

According to the reshaping device of the present disclosure, an anti-reflection film may also be coated on the incident surface and/or the exit surface of the prism to reduce light beam loss. The anti-reflection film can reduce the intensity of reflected light, thereby increasing the intensity of transmitted light. The anti-reflection film can be designed or selected according to the angle of incidence or angle of exit. For example, the anti-reflection film on one of the incident surface and the exit surface may be designed or selected for an incident angle or exit angle of 0 to 10 degrees, whereas the anti-reflection film on the other of the incident surface and the exit surface may be designed or selected for an incident angle or exit angle of 40 to 60 degrees. In addition to the incident angle and the exit angle, the design or selection of the anti-reflection film may also consider factors such as the wavelength of the laser light source, the material of the prism, or the angle between the incident surface and the exit surface.

The focus adjustment device 500 according to the present disclosure will be described below with reference to FIG. 7A to FIG. 7C. The focus adjustment device 500 is composed of a first optical portion 510 and a second optical portion 520. The distance between the first optical portion 510 and the second optical portion 520 is adjustable. By changing the distance between the first optical portion 510 and the second optical portion 520, the divergence of the outgoing light beam can be adjusted, thereby adjusting the waist position (i.e., the focusing position) of the light beam on the optical axis O (i.e., the Y-axis direction shown in FIGS. 1A to 3B) so that the light beam is focused at the predetermined position L0. It is desired to focus the light beam on the particles P passing through the detection channel 21, for example, the center position of the detection channel 21, so that accurate detection results can be obtained.

Referring to FIG. 7A to FIG. 7C, the first optical portion 510 is a concave lens, and the second optical portion 520 is a convex lens. It should be understood that each of the first optical portion 510 and the second optical portion 520 is not limited to the specific example shown, but may be composed of any suitable optical lens or lens group. For example, each of the first optical portion 510 and the second optical portion 520 may be selected from one of a convex lens, a concave lens, a cylindrical lens, a doublet lens, or a lens group.

In FIG. 7A, the light beam is focused on position L1, to the right of the predetermined position L0. The second optical portion 520 is moved toward the first optical portion 510, i.e., to the left, so as to adjust the waist position of the light beam to the predetermined position L0, as shown in FIG. 7B.

In FIG. 7C, the light beam is focused on position L2, to the left of the predetermined position L0. The second optical portion 520 is moved away from the first optical portion 510, i.e., to the right, so as to adjust the waist position of the light beam to the predetermined position L0, as shown in FIG. 7B.

In the example shown in FIG. 7A to FIG. 7C, the first optical portion 510 is fixed, and the second optical portion 520 is movable relative to the first optical portion 510. Similarly, in an alternative example not shown, the second optical portion 520 may be fixed while the first optical portion 510 may be movable relative to the second optical portion 520. Alternatively, both the first optical portion 510 and the second optical portion 520 may be moved toward or away from each other.

The light beam incident to the focus adjustment device 500 may be parallel, or may be divergent. Thus, the focus adjustment device 500 may be provided at any suitable position between the laser light source and the focusing lens, for example, between the laser light source and the beam combiner in FIG. 1A to FIG. 3B.

As described above, the focusing spots of the light beams of multiple laser light sources can have the same size in the predetermined direction by the reshaping device, or the light beams of multiple laser light sources can be focused on the same predetermined position (i.e., the desired interrogation point) by the focus adjustment device, so that the detection accuracy can be improved.

It should be understood that the adjustment or movement of the optical device described above can be done manually, or can be done electronically using a computing device (e.g., a controller) associated with one or more actuators coupled to the optical device.

It should be understood that the reshaping device or the focus adjustment device can be integrated with the laser light source in the laser module, or can be set independently of the laser module.

The optical system of the sample processing instrument should not be limited to the specific examples described herein or shown in the drawings, but may vary according to actual detection requirements. For example, optical elements can be replaced, reduced or added depending on detection performance requirements.

Although the present application has been described with reference to exemplary embodiments, it should be understood that the present application is not limited to the specific embodiments described and illustrated herein. Without departing from the scope defined by the claims, those skilled in the art can make various changes to the exemplary embodiments. Provided that there is no contradiction, the features in the various embodiments can be combined with each other. Alternatively, a certain feature in the embodiment may also be omitted.

The invention claimed is:

1. An optical system for a sample processing instrument, wherein the sample processing instrument comprises a flow cell having a detection channel for passage and detection of a sample, the optical system comprising:

a plurality of laser sources configured to emit light beams having different sizes at least in a first direction;

a collimating device configured to collimate the light beams emitted from the plurality of laser sources;

a focusing lens configured to focus the light beams coming from the plurality of laser sources on a point within the detection channel; and a reshaping device disposed between the collimating device and the focusing lens and configured to reshape a light spot of the collimated light beam, wherein the reshaping device comprises a first prism pair comprising two prisms, and the two prisms are adjustable relative to each other, so that all the light beams of the plurality of laser sources, after reshaping, have a same predetermined size in a first direction.

2. The optical system according to claim 1, wherein the reshaping device further comprises a second prism pair comprising two prisms, and the two prisms are adjustable relative to each other, so that each light beam of the plurality of laser sources has a predetermined size in a second direction perpendicular to the first direction.

3. The optical system according to claim 1, wherein the two prisms of the prism pair or each prism pair are rotatable and/or translatable relative to each other.

4. The optical system according to claim 1, wherein the two prisms of the prism pair or each prism pair are made of the same material.

5. The optical system of claim 4, wherein the material has a refractive index ranging from 1.4 to 1.8.

6. The optical system according to claim 4, wherein each of the two prisms of the prism pair or each prism pair has an incident surface where the light beam enters the prism and an exit surface where the light beam exits the prism, and the two prisms of the prism pair or each prism pair are arranged to have the same incident angle at the incident surfaces and the same exit angle at the exit surfaces with respect to the same light beam.

7. The optical system according to claim 6, wherein the two prisms of the prism pair or each prism pair have the same structure.

8. The optical system according to claim 6, wherein an angle between the incident surface and the exit surface of each prism is in the range of 20° to 45°.

9. The optical system according to claim 6, wherein an anti-reflection film is coated on the incident surface and/or the exit surface.

10. The optical system of claim 9, wherein the anti-reflection film on one of the incident surface and the exit surface is designed or selected for an incident angle or an exit angle of 0° to 10°, and the anti-reflection film on the other of the incident surface and the exit surface is designed or selected for an incident angle or an exit angle of 40° to 60°.

11. The optical system according to claim 1, wherein the prism pair or each prism pair is configured such that the size ratio of the light beam after exiting the prism pair to the light beam before entering the prism pair is between 0.5 and 2.75.

12. The optical system according to claim 1, wherein a focus adjustment device is provided between the laser source and the focusing lens, and the focus adjustment device is configured to adjust focus of the light beam emitted from the laser source to a predetermined position within the detection channel.

13. The optical system according to claim 12, wherein the focus adjustment device is composed of two optical parts, the distance between the two optical parts is adjustable, and each of the two optical parts is selected from one of a convex lens, a concave lens, a cylindrical lens, a doublet lens, or a lens group.

14. The optical system according to claim 12, wherein a light beams emitted by the plurality of laser sources have mutually different wavelengths, and a beam-combination mirror is provided between each laser source and the focusing lens.

15. The optical system according to claim 14, wherein the reshaping devices and the focus adjustment devices are disposed between each laser light source and the corresponding beam combiner.

16. A sample processing instrument comprising the optical system according to claim 1 and a flow cell, wherein the flow cell has the detection channel through which a liquid sample flows, and the optical system is configured to detect particles in the liquid sample.

* * * * *